United States Patent [19]

Matsumoto et al.

[11] Patent Number: 4,802,004
[45] Date of Patent: Jan. 31, 1989

[54] PREDICTIVE CODING SYSTEM FOR TV SIGNALS

[75] Inventors: Shuichi Matsumoto, Hiratsuka; Hitomi Murakami, Yokohama, both of Japan

[73] Assignee: Kokusai Denshin Denwa Kabushiki Kaisha, Tokyo, Japan

[21] Appl. No.: 81,112

[22] Filed: Aug. 3, 1987

[30] Foreign Application Priority Data

Aug. 11, 1986 [JP] Japan .................................. 61-188012

[51] Int. Cl.$^4$ ............................................... H06N 7/12
[52] U.S. Cl. ..................................... 358/133; 358/135; 358/136; 375/27
[58] Field of Search ............... 358/133, 135, 136, 138; 375/27, 33, 31

[56] References Cited

U.S. PATENT DOCUMENTS

| | | | |
|---|---|---|---|
| 2,905,756 | 9/1959 | Graham | 358/135 |
| 4,517,596 | 5/1985 | Suzuki | 358/138 |
| 4,571,618 | 2/1986 | Hatori et al. | 358/136 |
| 4,691,233 | 9/1987 | Acampora | 358/136 |

Primary Examiner—James J. Groody
Assistant Examiner—John K. Peng
Attorney, Agent, or Firm—Emmanuel J. Lobato; Robert E. Burns

[57] ABSTRACT

A predictive TV signal coding system is disclosed, in which a predictive value of a picture element to be coded is obtained from information of an already coded picture element, a representative quantization value of the picture element to be coded is determined in accordance with the magnitude of the predictive value, and a difference value between the representative quantization value and the predictive value is coded for transmission without quantization.

2 Claims, 5 Drawing Sheets

PREDICTIVE CODING SYSTEM FOR TV SIGNALS

BACKGROUND OF THE INVENTION

The present invention relates to a predictive coding system which performs highly efficient coding of image signals as of a commercial TV or conference TV system through utilization of high correlation between adjacent picture elements in a picture, and more particularly to a predictive TV signal coding system which permits easy materialization of various predictive coding systems.

Standard TV signals at present consist of pictures called frames which are sent at the rate of 30 per second for NTSC system and 25 per second for PAL and SECAM systems, and each frame is subjected to interlaced scanning every other scanning line and, therefore, consists of two successive fields. Elements making up the pictures are commonly referred to as "picture elements", but since digital processing is considered in the present invention, each sample obtained by sampling will hereinafter be called a picture element. Accordingly, in this instance the position of each picture element in the picture depends upon the sampling frequency for digitizing a signal.

In general, digital processing which retains the real time property calls for a high-speed operation. That is, the real time property cannot be maintained unless the coding of one picture element is processed within its one sampling period. However, it is very difficult to provide an effective predictive coding system for TV signal of simplified hardware without lowing the coding efficiency and increasing the amount of hardware used.

SUMMARY OF THE INVENTION

An object of the present invention is to provide a predictive coding system which permits a substantial reduction of the amount of coding operations, without lowering the coding efficiency and increasing the amount of hardware used, thereby allowing ease in materializing the coding apparatus.

According to the present invention, in case of coding an input picture element, its predictive value is obtained from information on an already coded picture element, the quantized representative value of the input picture element is determined in accordance with the magnitude of the predictive value, and a difference between the quantized representative value and the predictive value is coded as it is.

BRIEF DESCRIPTION OF THE DRAWINGS

The present invention will be described in detail below in comparison with prior art with reference to the accompanying drawings, in which.

DETAILED DESCRIPTION

To make deferences between the present invention and prior art clear, a description will be given first of a conventional predictive coding system.

Figure 1:
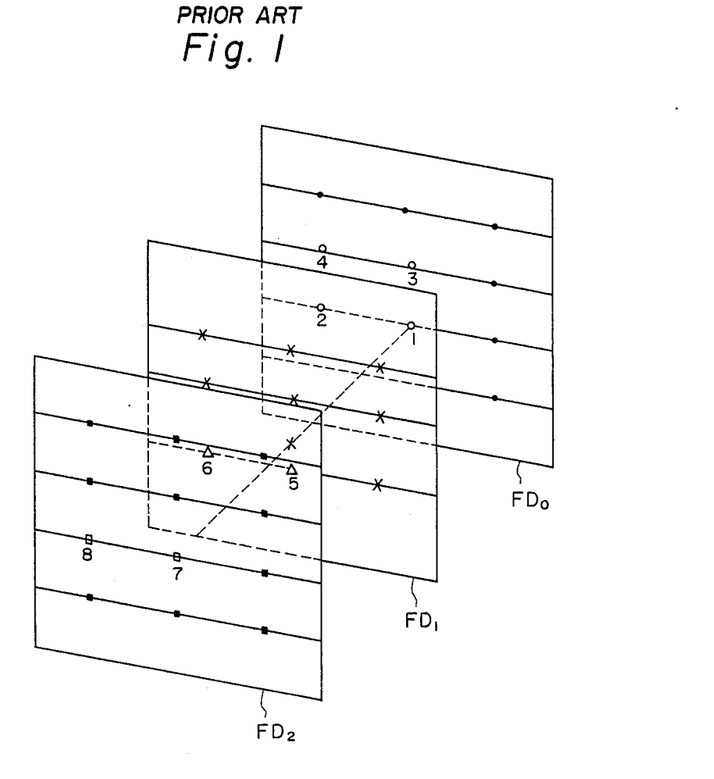
FIG. 1 is a schematic diagram showing the arrangement of picture elements explanatory of a conventional predictive coding system.

FIG. 1 shows the positional relationship of picture elements 1 to 8. Now, since a sampling frequency $f_s$ is selected to be an integer multiple of a horizontal scanning frequency, the picture elements are arranged in a matrix form, and because of the interlaced scanning, scanning lines in a previous field $FD_1$ are interposed between scanning lines in the current field $FD_0$. In this case, the picture element 2 lies on the same scanning line as and at the right of the picture element 1 in the current field, the picture elements 3 and 4 lie just above the picture elements 1 and 2, respectively, in the same field $FD_0$, and the picture elements 5 and 6 lie just below the picture elements 1 and 2, respectively, in the immediately preceding field $FD_1$. The picture elements 7 and 8 assume the same positions as the picture elements 1 and 2, respectively, in a field $FD_2$ of the immediately preceding frame.

In this instance, since it can be considered that high correlation exists between sampled values of he neighboring picture elements, the prior art employs the following method: A predictive value $\overline{X}_1$ of the sample value $X_1$ of the picture element 1 is produced, for example, as follows, using sampled values of the adjoining picture elements:

$$\overline{X}_1 = (\tfrac{1}{2})X_2 + X_3 - (\tfrac{1}{2})X_4 \tag{1}$$

A difference between the predictive value $\overline{X}_1$ and the true value $X_1$ $$0X_1 = X_1 - \overline{X}_1 \tag{2}$$

is used as a prediction error and quantized for coding, by which the required number of bits to be transmitted is reduced for high efficiency coding.

The quantization is generally split into nonlinear quantization and linear quantization. With the nonlinear quantization, the widths of the input ranges of prediction errors (the quantization step size) differ from one another at each level number and fixed-length codes are usually employed for transmission as shown in Table 1. With the linear quantization, as shown in Table 2, the quantization step size is common to all level numbers (Table 2 shows an example in which the quantization step size is "5".) and variable-length codes are used which are allotted in an increasing order of length, beginning with the innermost level number under consideration of properties of prediction error signals. Accordingly, the latter system is excellent from the viewpoint of reducing the required number of bits to be transmitted, and the linear quantization is generally employed in the high efficiency coding system.

TABLE 1

| Level Number | Range of Input Level | Representative Value of Output | Transmission Code |
| --- | --- | --- | --- |
| . | . | . | . |
| . | . | . | . |
| . | . | . | . |
| −9 | −119 ~ −100 | −109 | 11000 |
| −8 | −99 ~ −72 | −85 | 10111 |

TABLE 1-continued

| Level Number | Range of Input Level | Representative Value of Output | Transmission Code |
|---|---|---|---|
| −7 | −71~−56 | −62 | 10110 |
| −6 | −55~−42 | −48 | 10101 |
| −5 | −41~−30 | −35 | 10100 |
| −4 | −29~−20 | −24 | 10011 |
| −3 | −19~−12 | −15 | 10010 |
| −2 | −11~−6 | −8 | 10001 |
| −1 | −5~−2 | −3 | 10000 |
| 0 | −1~1 | 0 | 00000 |
| 1 | 2~5 | 3 | 00001 |
| 2 | 6~11 | 8 | 00010 |
| 3 | 12~19 | 15 | 00011 |
| 4 | 20~29 | 24 | 00100 |
| 5 | 30~41 | 35 | 00101 |
| 6 | 42~55 | 48 | 00110 |
| 7 | 56~71 | 62 | 00111 |
| 8 | 72~99 | 85 | 01000 |
| 9 | 100~11 | 109 | 01001 |
| . | . | . | . |

TABLE 2

| Level Number | Range of Input Level | Representative Value of Output | Transmission code |
|---|---|---|---|
| . | . | . | . |
| −9 | −47~−43 | −45 | 010000000101 |
| −8 | −42~−38 | −40 | 01000000011 |
| −7 | −37~−33 | −35 | 010000001 |
| −6 | −32~−28 | −30 | 01000001 |
| −5 | −27~−23 | −25 | 0100001 |
| −4 | −22~−18 | −20 | 010001 |
| −3 | −17~−13 | −15 | 01001 |
| −2 | −12~−8 | −10 | 0101 |
| −1 | −7~−3 | −5 | 011 |
| 0 | −2~2 | 0 | 1 |
| 1 | 3~7 | 5 | 001 |
| 2 | 8~12 | 10 | 0001 |
| 3 | 13~17 | 15 | 00001 |
| 4 | 18~22 | 20 | 000001 |
| 5 | 23~27 | 25 | 0000001 |
| 6 | 28~32 | 30 | 00000001 |
| 7 | 33~37 | 35 | 000000001 |
| 8 | 38~42 | 40 | 00000000011 |
| 9 | 43~47 | 45 | 00000000010 |
| . | . | . | . |

The above is the conventional predictive coding system. In general, digital processing which retains the real time property calls for a high-speed operation. That is, the real time property cannot be maintained unless the coding of one picture element is processed within its one sampling period Ts (a reciprocal of the sampling frequency $f_s$). For example, in case of broadcasting TV signals, the signal band is 4.2 MHz for NTSC and 5 MHz for PAL and SECAM, its sampling frequency $f_s$ is generally 10 MHz or higher, and the processing time for one picture element is 100 ns or less. Furthermore, in case of recent TV signals called high-definition TV signals, it is expected that the sampling frequency $f_s$ is above 50 MHz, and the processing time for one picture element will be less than 20 ns.

With such a background, it is an important factor to the evaluation of the predictive coding system for TV signals whether the system can be realized in the form of hardware.

From this point of view, a description will be given, with reference to FIGS. 2A and 2B, of the possibility of materialization of the above-mentioned predictive coding system in the hardware form.

Figure 2A:
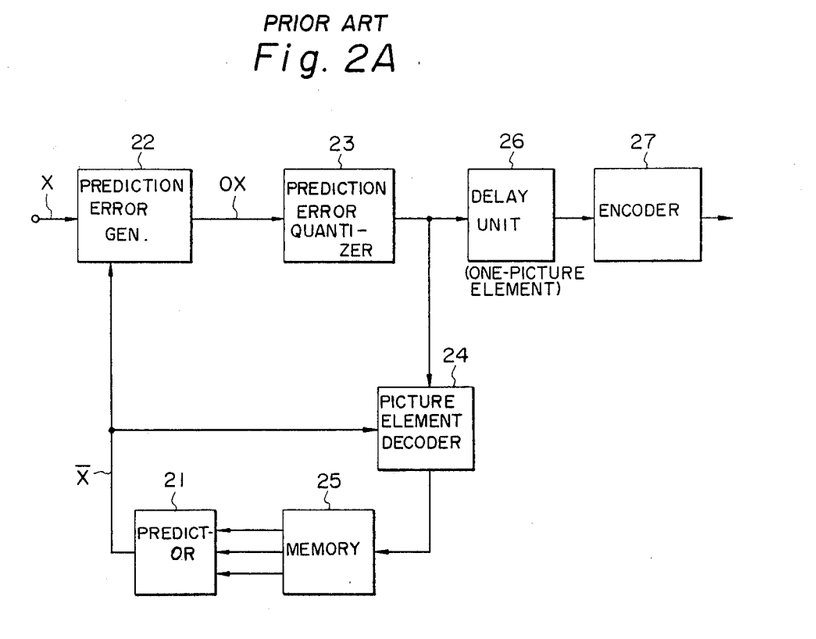
FIGS. 2A and 2B are a block diagram illustrating an example of the arrangement of the prior art predictive coding system and its equivalent circuit diagram.
Figure 2B:
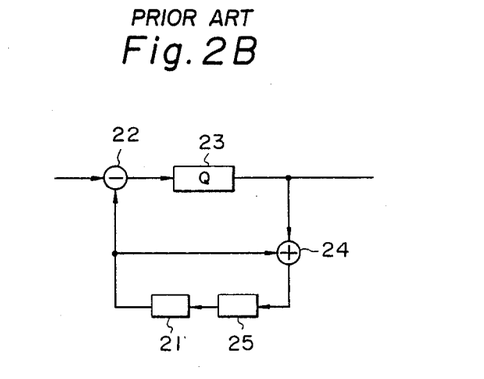

FIGS. 2A and 2B illustrate an example of the arrangement of the transmitting side of the conventional predictive coding system, FIG. 2A being its block diagram and FIG. 2B showing its equivalent circuit. In FIGS. 2A and 2B, reference numeral 21 indicates a predictor, 22 a prediction error generator for generating a difference between an input picture element value and a predictive value, 23 a prediction error quantizer for quantizing the prediction error, 24 a picture element decoder for decoding the input picture element on the bases of the quantized prediction error value and the predictive value, 25 a memory for storing TV signals, 26 a one-picture-element delay unit, and 27 an encoder for providing the quantized prediction error value on a transmission line.

It will be seen from FIG. 2A that this example basically utilizes a feedback method.

According to FIG. 2A, the amount of operation and procedure for coding one picture element are as follows:

(1) Decoded picture elements stored in the memory 25 ($X_2$, $X_3$, and $X_4$ for example, in case of an intra-field prediction) are read out. Let the amount of operation be represented by $T_R$.

(2) A predictive value is produced in the predictor 21. Let the amount of operation be represented by $T_P$.

(3) In the prediction error generator 22, a prediction error is produced on the bases of the input picture element and the predictive value. Let the amount of operation be represented by $T_S$.

(4) A quantized representative value is produced in the prediction error quantizer 23. Let the amount of operation be represented by $T_Q$.

(5') In the encoder 27, the quantized representative value is converted to a required transmission code.

(5) In the picture element decoder 24, a decoded value is produced on the bases of the predictive value and the quantized representative value. Let the amount of operation be represented by $T_A$.

(6) The decoded value is stored in the memory 25 for the prediction of the next input picture element. Let the amount of operation be represented by $T_W$.

If the operations (1) through (6) except (5') are not completed within the one-picture-element sampling interval (given as a reciprocal of the sampling frequency $f_s$), then it will be difficult to encode and transmit a TV signal in real time, making it difficult to embody the system in the hardware form. Accordingly, the condition for materializing the predictive coding system in the hardware form is given by the following equation:

$$T_O = T_R + T_P + T_S + T_Q + T_A + T_W \leq 1/f_s \qquad (3)$$

As noted before, the TV sampling frequency $f_s$ needs to be twice more than the video signal band, and it is usually 10 MHz or higher for broadcasting TV signals; therefore, one sampling interval is less than 100 ns. On the other hand, the amounts of operation for coding, $T_R$, $T_S$, $T_Q$, $T_A$ and $T_W$ are fixed regardless of the predictive coding system used, whereas the amount of operation $T_P$ for the predictive value depends upon the prediction system employed. Accordingly, in order to satisfy Eq. (3) for materializing the coding apparatus, the prior art contemplates the simplification of the prediction system, for example, by creating the field predicting value as follows:

$$X_1' = X_2 \quad (4)$$

to thereby reduce the amount of operation $T_P$. In this instance, however, there remains unsolved the problem that the prediction error becomes large, lowering the coding efficiency.

Moreover, in a case where the video signal band is more than five times higher than that of the broadcasting TV signal as in the case if the high quality TV signal, the sampling frequency becomes very hard and the following equation holds:

$$T_R + T_S + T_Q + T_A + T_W > 1/f_s \quad (5)$$

Even if the prediction system is simplified, it will be difficult to materialize the coding apparatus. One possible technique in this case is to equivalently decrease the amount of operation for coding through parallel processing by use of a plurality of predictive coding circuits, but this increases the amount of hardware required, and hence does not lead to an essential solution to the problem.

With reference to the accompanying drawings, the present invention will hereinafter be described in detail.

Figure 3A:
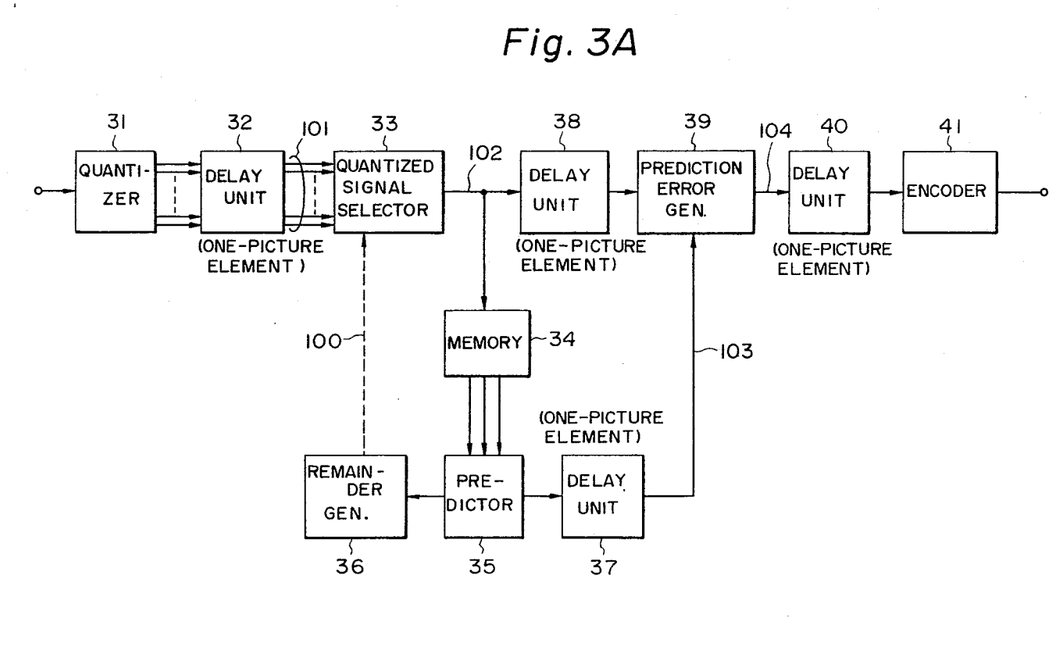
FIGS. 3A and 3B are a block diagram illustrating an embodiment of the present invention and its equivalent circuit diagram.
Figure 3B:
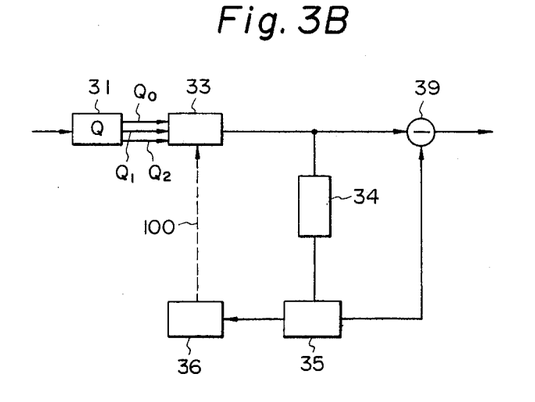

FIGS. 3A and 3B illustrate an embodiment of the present invention, FIG. 3A being a block diagram and FIG. 3B an equivalent circuit diagram of its basic portion. The following description will be given of an example in which the quantization step size is "3". In FIGS. 3A and 3B, reference numeral 31 indicates a quantizer for quantizing an input picture element value, 32, 37, 38 and 40 one-picture-element delay units, 33 a quantized signal selector for obtaining the ultimate quantized value of the input picture element from residual information which results from the division of the predictive value by the quantization step size, 34 a memory for storing a TV signal, 35 a predictor, 36 a remainder generator for calculating the remainder of the predictive value, 39 a prediction error generator for obtaining a difference between the decoded value and the predictive value, and 41 an encoder for providing the prediction error value on the transmission line. A signal 100 is a control signal with which the remainder generator 36 controls the quantized signal selector 33, and a signal 102 indicates the ultimate quantization representative value of the input picture element.

Figure 4:
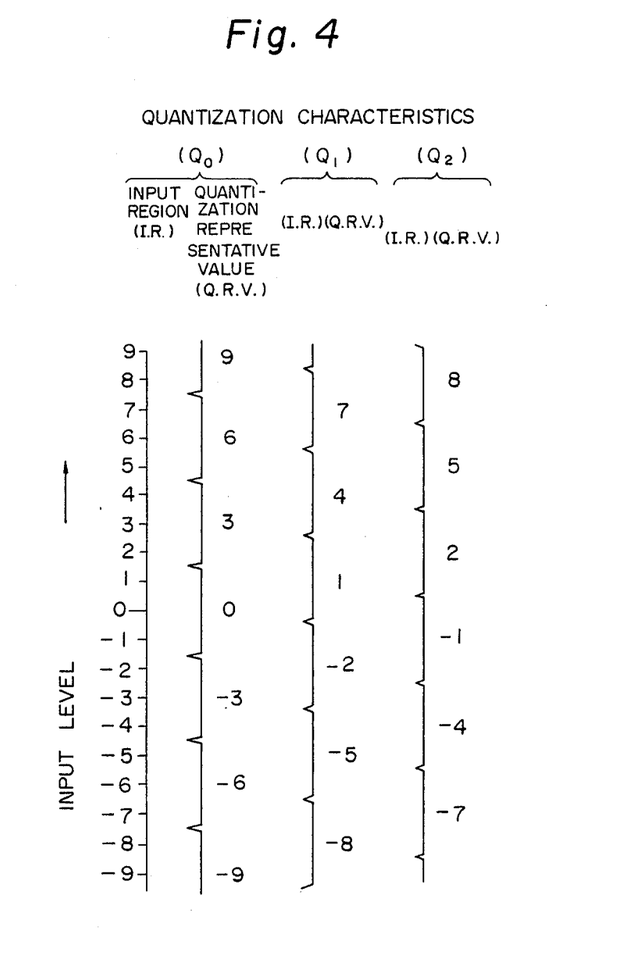
FIG. 4 is a schematic diagram explanatory of the quantizing operation in the present invention.

At first, sampled values of picture elements are each input into the quantizer 31 for each picture element. When the quantization steps size is "3", the quantizer 31 has such three quantizing characteristics as shown in FIG. 4, and provides one quantization representative value for each characteristic. Assuming that a sampled value with an input level "4" in case of FIG. 4, the quantizer 31 provides a "3" as the quantization representative value for the characteristic $Q_0$, a "4" for the characteristic $Q_1$ and a "5" for the characteristic $Q_2$. The three quantization representative values are candidates for the ultimate quantization representative value 102 of the input picture element, as will be described later.

Such a quantizer 31 can be constituted by arranging three quantizers in parallel or by calculating method.

After this, the coding takes place basically following the steps mentioned below.

(1) Decoded picture elements stored in the memory 34 ($X_2$, $X_3$ and $X_4$ in the case of an intra-field prediction, for instance) are read out.

(2) A predictive value is produced in the predictor 35.

(3) In the remainder generator 36, the remainder (MOD) is obtained that results from the division of the predictive value by the quantization step size ($\Delta$). Since MOD $= 0 \sim (\Delta - 1)$, however, the remainder will be "0", "1" or "2" in a case where $\Delta = 3$.

(4) The remainder generator 36 applies the information 100 to the quantized signal selector 33 to control it to yield, as its output signal 102, the quantization representative value for the quantization characteristic $Q_0$ when MOD $= 0$, the quantization representative value for the quantization characteristic $Q_1$ when MOD $= 1$, and the quantization representative value for the quantization characteristic $Q_2$ when MOD $= 2$.

(5) In the prediction error generator 39, a quantized prediction error value 104 is produced on the basis of a difference between the quantized output value 102 and the predictive value 103.

(6') The quantized prediction error value 104 is converted by the encoder 41 into a required transmission code.

(6) The quantized output value 102 is stored in the memory 34 for the prediction of the next input picture element.

Incidentally, the one-picture-element delay units 32, 37, 38 and 40 are delay means for processing by the so-called pipeline system, not for performing the coding of one picture element within the one sampling interval $1/f_s$. With the provision of these delay units 32, 37, 38 and 40, the coding operation for one picture element can be divided into independent operations by (1) the quantizer 31, (2) the predictor 35, the remainder generator 36, the quantized signal selector 33 and the memory 34, (3) the prediction error generator 39, and (4) the encoder 41. Each processing needs only to be finished within one sampling interval $1/f_s$. This will not only improve the precision of operation but also permit high-speed operations equivalently even with elements of relatively low operating speed, thus making it easy to embody the system in hardware. The operation time will be described later in detail.

Next, it will be demonstrated that this coding system is able to produce the same decoded image as is obtainable with the aforenoted conventional system and is free from a coding loss.

At first, a decoded value by the prior art system will be analyzed.

Now, let the input picture element value be represented by $x_i$ and the predictive value therefor by $\tilde{x}_i$. Further, let the quantization step size of a linear quantizer used in the conventional quantizer be represented by $\Delta$ and the quantization representative value of a prediction error signal by $Q(x_i - \tilde{x}_i)$.

At this time, the decoded value $\bar{x}_i$ of the input picture element value $x_i$ is given by the following equation:

$$\bar{x}_i = \tilde{x}_i + Q(x_i - \tilde{x}_i) \quad (6)$$

Further, since it holds that $$Q(x_i - \tilde{x}_i) = m_i \Delta \text{ (where } m_i \text{ is an integer)} \quad (7)$$

the decoded value $\bar{x}_i$ becomes as follows:

$$\bar{x}_i = \tilde{x}_i + m_i \Delta \quad (8)$$

On the other hand, by substituting in Eq. (8) $x_i$ in the following form:

$$x_i = n_i \Delta + \epsilon_i \quad (9)$$

($\epsilon_i$ represents the remainder resulting from the division of $x_i$ by $\Delta$, where $\epsilon_i = 0 \sim (\Delta - 1)$, and $n_i$ is an integer) the decoded value $\bar{x}_i$ becomes as follows:

$$\bar{x}_i = (m_i + n_i)\Delta + \epsilon_i (\epsilon_i = 0 \sim \Delta - 1) = x_i + q_i \quad (10)$$

where $q_i$ is a quantization error and $|q_i| \leq [\Delta/2]$ ([ ] meaning the omission of the figures below the decimal point).

In contrast thereto, the decoded value $\bar{x}_i'$ in the coding system of this embodiment is obtained by directly quantizing the input picture element, and the quantization characteristic is determined by the remainder $\epsilon_i$ resulting from the division of the predictive value $x_i$ by the quantization step size $\Delta$. If $$n_i'\Delta - [\Delta/2] + \epsilon_i \leq x_i \leq n_i'\Delta + [\Delta/2] + \epsilon_i$$

then it will follow that $$\begin{aligned} x_i' &= n_i'\Delta + \epsilon_i \text{ (where } n_i' \text{ is an integer)} \\ &= x_i + q_i' \left( \text{where } |q_i'| \leq \left[\frac{\Delta}{2}\right] \right) \end{aligned} \quad (11)$$

From Eqs. (10) and (11) it follows that $$\bar{x}_i - x_i' = (m_i + n_i - n_i')\Delta = q_i - q_i' \quad (12)$$

On the other hand, from $$|q_i' - q_i| \leq 2[\Delta/2] = \Delta - 1$$

it holds that $$-\Delta + 1 \leq (m_i + n_i - n_i')\Delta \leq \Delta - 1 \quad (13)$$

Since $m_i + n_i - n_i'$ satisfies this is only when it is zero, the following equation holds:

$$n_i' = m_i + n_i \quad (14)$$

From Eq. (11), $x_i' = (m_i + n_i)\Delta + \epsilon_i$, with the result that the values are exactly equal to each other, indicating that this coding system and the conventional one are equivalent.

Next, how much the materialization of this coding system in hardware is easier than in the case of the conventional system will be verified in terms of the amount of operation (time).

As depicted in FIG. 3A, this coding system includes the four one-picture-element delay units 32, 37, 38 and 40, and if their operations are each completed within one sampling interval ($1/f_s$), then a real time coding and transmission can be achieved, enabling the materialization of the coding apparatus. The amount of operations will be obtained concretely.

At first, the operation involved to the first delay unit 32, as viewed from the input image signal, is only by the quantizer 31, and the amount of operations is the same amount of operations $T_Q$ as by the quantizing unit in the prior art system.

The operations which are involved from the delay unit 32 to the delay units 37 and 38 are varried out by the quantized signal selector 33, the memory 34, the predictor 35, and the remainder generator 36. The total amount of operation ($T_1$) needed in this case is the sum of the operations by the quantized signal selector 33 (the amount of operations being identified by $T_{DS}$), a write ($T_W$) in and a readout ($T_R$) from the memory 34, the operations by the predictor 35 ($T_P$), and the operations by the remainder generator 35 ($T_M$), as shown below.

$$T_1 = T_{DS} + T_W + T_R + T_P + T_M \quad (15)$$

Furthermore, the operations which are involved from the delay units 37 and 38 to the delay unit 40 are only by the prediction error generator 39, and the amount of operations needed therefor are $T_S$.

The amount of operations from the delay unit 40 to the output is only by the encoder 41, and the amount of operation needed therefor is identified by $T_T$.

It is essential to the real time coding and transmission by this coding system that any of these operations is completed within one sampling interval. This condition is given by the following equation:

$$\text{Max}\{T_Q, T_1, T_S, T_T\} \leq 1/f_s \quad (16)$$

Since the amount of operations $T_1$ becomes maximum in view of the processing speed of an IC element at present, the above equation becomes as follows:

$$T_1 = T_{DS} + T_W + T_R + T_P + T_M \leq 1/f_s \quad (17)$$

Moreover, since the remainder generator 36 for producing the remainder of the predictive value can be formed by a ROM (Read Only Memory) as is the case with the quantizer 31, $T_M = T_Q$. Accordingly, the ultimate condition for embodying this coding system in hardware is given by the following equation:

$$T_{DS} + T_W + T_R + T_P + T_Q \leq 1/f_s \quad (18)$$

With Eqs. (3) and (19), this coding system and the conventional system can be compared with each other for their feasibility in hardware. A difference $T$ in the amount of operations between the both systems is as follows:

$$T = T_0 - T_1 = T_S + T_A - T_{DS} \quad (19)$$

The above amounts of operations, which are obtained concretely in terms of operation times of various computing elements in FAST-TTL-IC which is a typical high-speed IC, are as follows:

$$\left.\begin{aligned} T_S &= 19.0 \text{ (ns)} \\ T_A &= 19.0 \text{ (ns)} \\ T_{DS} &= 9.0 \text{ (ns)} \end{aligned}\right\} \quad (20)$$

Accordingly, it can be said that the amount of operations needed in this coding system is 29 ns smaller than in the conventional system.

In other words, for example, even in a case where it is inevitable, for embodying the prior art system in hardware, to simplify the prediction system to the intrafield prediction system ($X_1'$) shown by Eq. (4), it is possible, with this coding system, to achieve the unsimplified intra-field predictive system ($X_1$) expressed by Eq. (1).

Moreover, in case of a typical sampling frequency $f_s = 13.5$ MHz, the conventional system cannot be materialized in hardware even if the predictive system $X_1'$ is employed, whereas this coding system can be embodied in hardware even if the predictive system $X_1$ is used.

Next, a brief description will be given of a decoding system which is employed in combination with the coding system of the present invention.

The decoding means is smaller in the amount of operations than the coding means. Accordingly, the decoding means for use in combination with the coding means of the present invention can be formed by decoding means of the prior art system. However, where very high-speed operations are required as in the high-quality TV as mentioned previously, it will be effective to divide the processing by use of the one-picture-element delay means as described previously with regard to the coding means.

Figure 5:
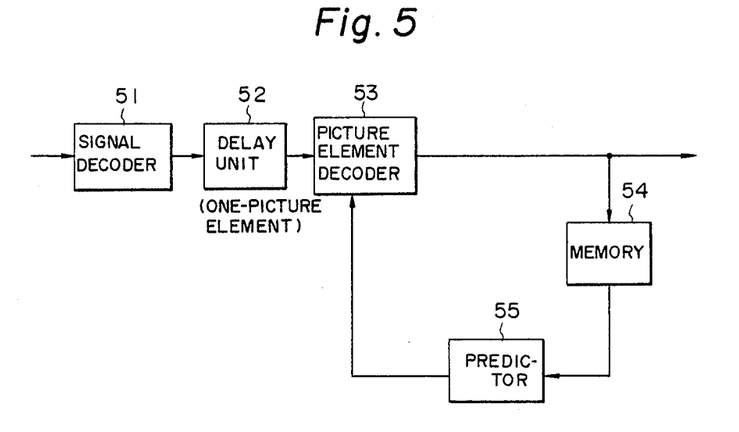
FIG. 5 is a block diagram illustrating an example of decoding means for decoding the coded output by the present invention.

FIG. 5 illustrates a specific operative example of such decoding means. In FIG. 5, reference numeral 51 indicates a signal decoder, 52 a one-picture-element delay unit, 53 a picture element decoder which can be formed basically by adding means, 54 a memory for storing those of decoded and output picture elements which are necessary for producing the predictive value, and 55 a predictor for producing the predictive value of the decoded picture element.

The received signal is decoded by the signal decoder 51 into a signal corresponding to a difference value obtained by the coding means. This signal is stored in the one-picture-element delay unit 52 for only one sampling interval, and while it is stored, an operation for obtaining the predictive value of the picture element is performed. In the next one sampling interval, the difference value and the predictive value are added together in the picture element decoder 53, providing an output picture element signal. This picture element signal is stored in the memory 54 for a required period of time for creating the predictive value of the next picture element.

As described above in detail, according to the present invention, when the sampled value of an input picture element is quantized, the quantizing characteristic therefor is changed in accordance with the magnitude of the predictive value of the picture element, by which a difference value between the predictive value and the quantized one can be made small. This makes the quantization of the difference value unnecessary, permitting a high efficiency signal transmission. Furthermore, according to the arrangement of the present invention, processing to be executed within one sampling interval can be distributed over a plurality of sampling intervals, allowing ease in materializing an apparatus which calls for high-speed operations.

What we claim is:

1. A predictive coding method for highly efficient coding image signals such as those of a commercial TV or a conference TV system through utilization of high correlation between adjacent picture elements in a picture, including the steps of:
obtaining a predictive value of an instant picture element to be coded after quantization of the instant picture element from information of an already coded picture element,
determining a representative quantization value of the instant picture element in accordance with a quantization characteristic predetermined in correspondence to the magnitude of the predictive value, and
coding a difference value between the representative quantization value and the predictive value for transmission without other quantization.

2. A predictive coding system for highly efficient coding signals such as those of a commercial TV or conference TV system through utilization of high correlation between adjacent picture elements in a picture, comprising:
first means for obtaining a predictive value of an instant picture element to be coded after quantization of the instant picture element from information of an already coded picture element,
second means connected to the first means for determining a representative quantization value of the instant picture element in accordance with a quantization characteristic predetermined in correspondence to the magnitude of the predictive value, and
third means connected to the first means and the second means for coding a difference value between the representative quantization value and the predictive value for transmission without other quantization.

* * * * *